F. W. GORDON.
ELECTRIC RAIL BOND.
APPLICATION FILED JUNE 29, 1915.
1,284,090.
Patented Nov. 5, 1918.
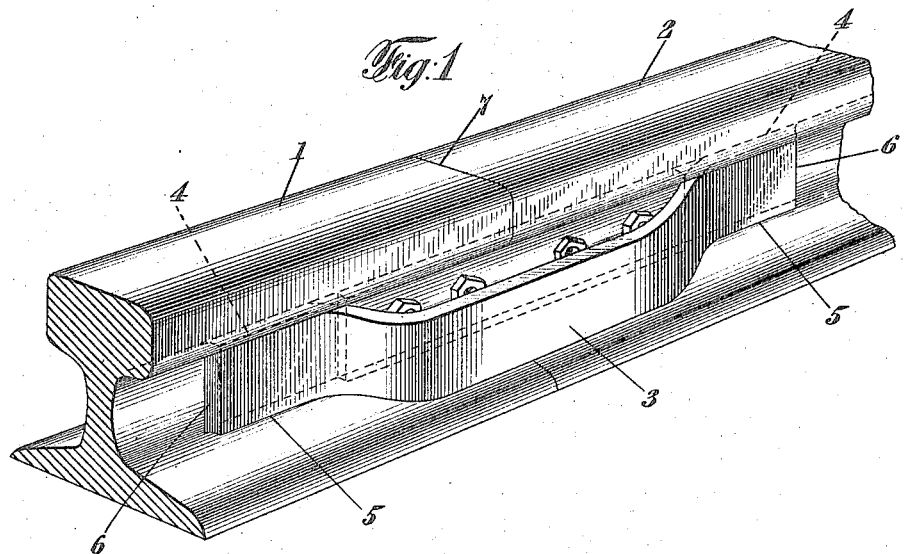
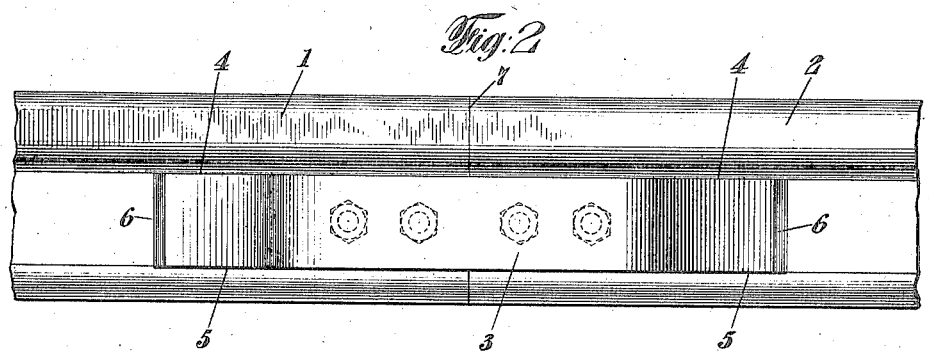
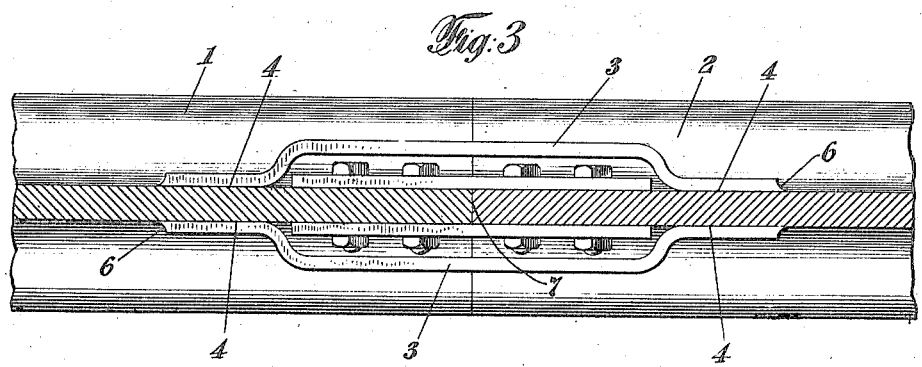
INVENTOR
Fred W. Gordon,
BY
Prindle, Wright & Small.
ATTORNEYS

UNITED STATES PATENT OFFICE.

FRED W. GORDON, OF NEW YORK, N. Y., ASSIGNOR TO QUASI-ARC WELDTRODE COMPANY, OF NEW YORK, N. Y., A CORPORATION OF NEW YORK.

ELECTRIC RAIL-BOND.

1,284,090.  Specification of Letters Patent.  Patented Nov. 5, 1918.

Application filed June 29, 1915. Serial No. 36,919.

*To all whom it may concern:*

Be it known that I, FRED W. GORDON, of New York, in the county of New York, and in the State of New York, have invented a certain new and useful Improvement in Electric Rail-Bonds, and do hereby declare that the following is a full, clear, and exact description thereof.

The object of my invention has been to provide an electric rail bond, which shall have, among others, the advantages of simplicity, of cheapness, of capability of being formed by welding, and of admitting relative movement of the bonded rails under the action of contraction and expansion, and to such ends my invention conists in an electric rail bond and method of forming the same hereinafter specified.

My invention is capable of embodiment in many different forms, and in the accompanying drawings I have illustrated the best embodiment thereof known to me, but such embodiment is to be regarded as typical only of many possible embodiments, and my invention is not to be confined to such specific embodiment.

In the accompanying drawings,

Figure 1 is a perspective view of portions of rails connected together in accordance with my invention;

Fig. 2 is a side elevation of the same; and,

Fig. 3 is a horizontal section of the same.

It is desired to form a bond between the rails 1 and 2 of such a nature as to effectively carry electric current from one to the other. It is necessary, however, in actual practice, to provide for a movement of the rails toward and from each other, due to alternations of temperature which serve to lengthen and contract the rails, so that their abutting ends approach and recede from each other. I also desire to use a simple conductor consisting preferably of a single piece of metal, and preferably one which can be cut from a sheet or bar and formed into final shape by a simple operation such as stamping. I also desire to unite the piece forming the bond with the rails by welding or other method, so as to form a perfect electric contact. These conditions are complied with by the construction and mode of operation which I shall now describe.

I form the bonding piece of an elongated plate or bar 3 which is narrow enough so that it can fit against the web of the rail between the tread and base. In the present instance I have shown the use of a plate. I weld the plate to the rail along its upper and lower side edges 4 and 5 at the ends of the plate, and also along its inner face, whereby the welded surfaces of the bond conform to the side recesses of the rail, and provide a large contact area between the rail and bond, since both the face and side edges of the latter are utilized for such purpose. I, however, avoid welding the plate 3 along its central portion where it approaches and crosses the joint 7 between the rails, and I deflect it from a straight line between its ends preferably as shown to form an arch 8, so that the ends may move with the respective rails to which they are secured, and the arch may bend to permit the relative movement of the rails as above referred to. The usual fish plates may or may not be used as desired, and my bonding plates may be used on both sides of the rail at the same time, if desired.

It will be understood that instead of one bond on a given side of a rail joint, several bonds may be used on such side.

I claim:

1. The combination with meeting rails, of a bond integrally united with each rail, said bond being conformed to the side recesses of the rails at the points of union therewith, said bond being arched intermediate its ends to take up expansion and contraction of the rails.

2. The combination with meeting rails of a bond connecting said rails and conforming to the side recesses thereof at the points of contact therewith, said bond being arched intermediate its ends to take up expansion and contraction of the rails.

3. In combination, abutting rail ends, and a fish plate securing said rails together, a bond fixed to said ends and inclosing said fish-plate, said bond comprising a strip of metal in contact with the side recesses of the rails along a face and both side edges.

In testimony that I claim the foregoing I have hereunto set my hand.

FRED W. GORDON.

Witnesses:
EDWIN J. PRINDLE,
AGNES F. MCLAUGHLIN.